United States Patent
Kwon et al.

(10) Patent No.: US 8,032,120 B2
(45) Date of Patent: Oct. 4, 2011

(54) VOICE MESSAGE TRANSMISSION SYSTEM, TRANSMISSION RESULT NOTIFICATION SYSTEM, AND METHODS THEREOF

(75) Inventors: Hyuk-Hoon Kwon, Seoul (KR); Tae-Wook Park, Seoul (KR); Seung-Ook Je, Seoul (KR); Sang-Yun Lee, Gyeonggi-do (KR); Hee-Hyeok Hahm, Seoul (KR); Bong-Ju Kang, Gyeonggi-do (KR)

(73) Assignee: SK Telecom Co., Ltd. (KR)

( * ) Notice: Subject to any disclaimer, the term of this patent is extended or adjusted under 35 U.S.C. 154(b) by 916 days.

(21) Appl. No.: 11/572,756

(22) PCT Filed: Jul. 26, 2005

(86) PCT No.: PCT/KR2005/002415
§ 371 (c)(1), (2), (4) Date: Oct. 24, 2007

(87) PCT Pub. No.: WO2006/011742
PCT Pub. Date: Feb. 2, 2006

(65) Prior Publication Data
US 2008/0051067 A1    Feb. 28, 2008

(30) Foreign Application Priority Data
Jul. 27, 2004    (KR) .................... 10-2004-0058650

(51) Int. Cl.
*H04M 11/10* (2006.01)
(52) U.S. Cl. ............... 455/413; 455/412.1; 455/414.1; 455/418; 455/466; 455/458
(58) Field of Classification Search .......... 455/466, 455/413, 412.1, 458, 445, 418, 414.1
See application file for complete search history.

(56) References Cited

U.S. PATENT DOCUMENTS

| 7,039,428 | B1 * | 5/2006 | Helferich ...................... 455/458 |
| 7,218,919 | B2 * | 5/2007 | Vaananen ................... 455/412.1 |
| 7,251,480 | B1 * | 7/2007 | Oh et al. ....................... 455/413 |
| 2002/0006782 | A1 * | 1/2002 | Kim ............................. 455/412 |
| 2002/0071528 | A1 * | 6/2002 | Kumamoto ................ 379/88.12 |

FOREIGN PATENT DOCUMENTS

| KR | 10-1999-0010310 | 2/1999 |
| KR | 10-2001-0059678 | 7/2001 |
| KR | 10-2004-0022822 | 3/2004 |

* cited by examiner

*Primary Examiner* — Kamran Afshar
*Assistant Examiner* — Mong-Thuy Tran
(74) *Attorney, Agent, or Firm* — Baker & Hostetler LLP

(57) ABSTRACT

A voice message transmission system and method which includes a sending terminal (MS) for registering a voice message and for receiving a notice of a message regarding the registered voice information; a base station controller (BSC) carrying out a call connection of the mobile communication network in response to a request for registering the voice message of the sending terminal (MS) received from a plurality of base stations(BTS); a mobile switching station (MSC/VLR) for carrying out a channel management and control connected from the base station controller (BSC) and carrying out a signal processing function according to the call connection; and an IP server interlocked with the mobile switching station (MSC/VLR), storing the voice message and outdialing on the basis of sender information, and then reproducing and outputting the voice message to the receiving terminal in the case that a receiving signal of the receiving terminal is recognized wherein the IP server includes a voice mailbox server (VMS) and a voice message management server for generating receiving information corresponding to a message identification of the receiving terminal.

20 Claims, 5 Drawing Sheets

[Fig. 1]
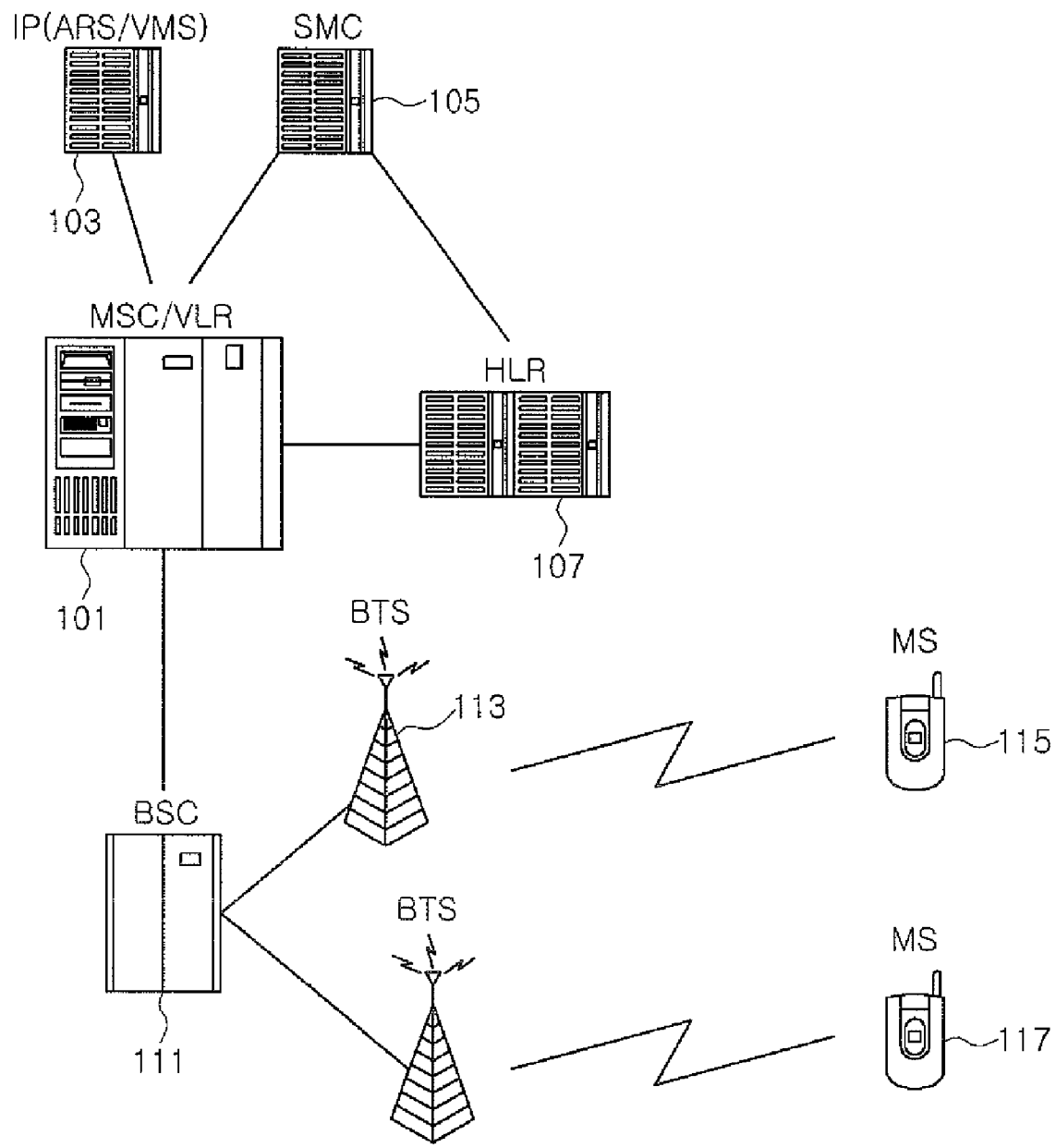

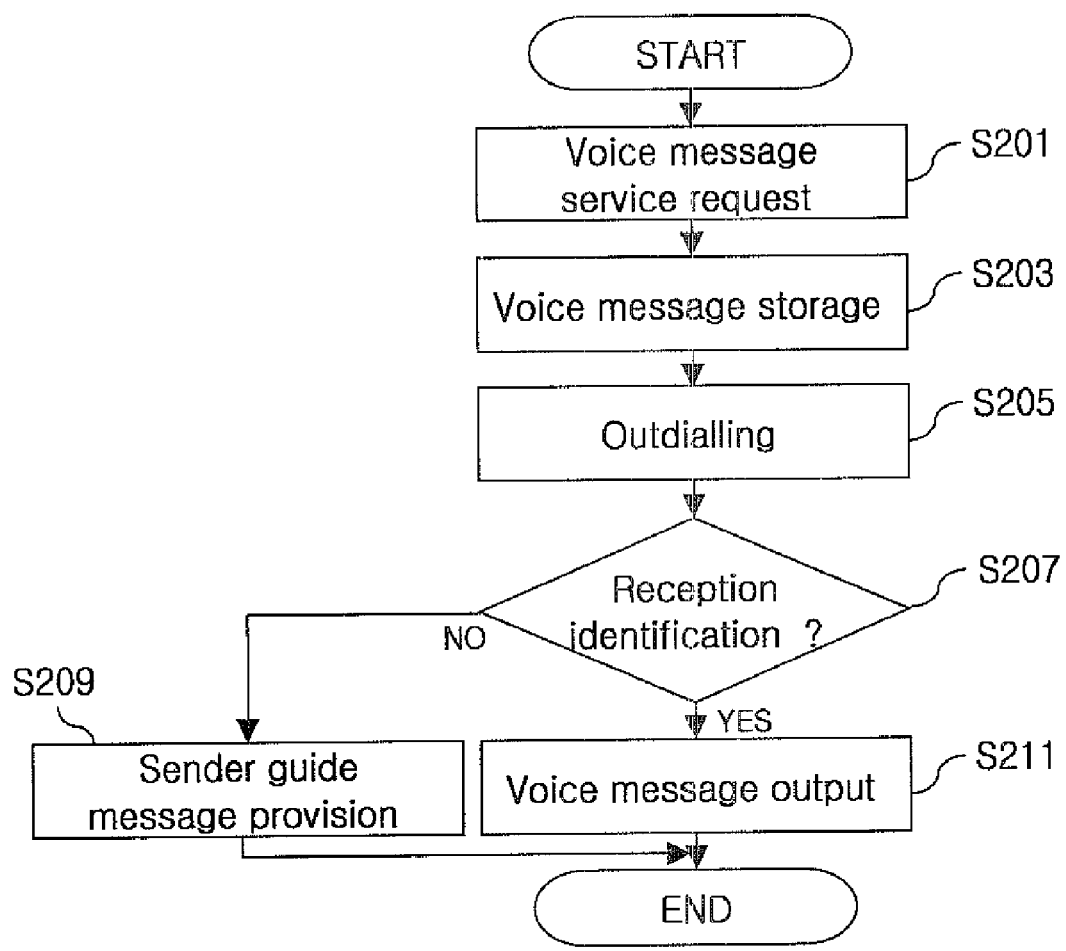
[Fig. 2]

【Fig. 3】
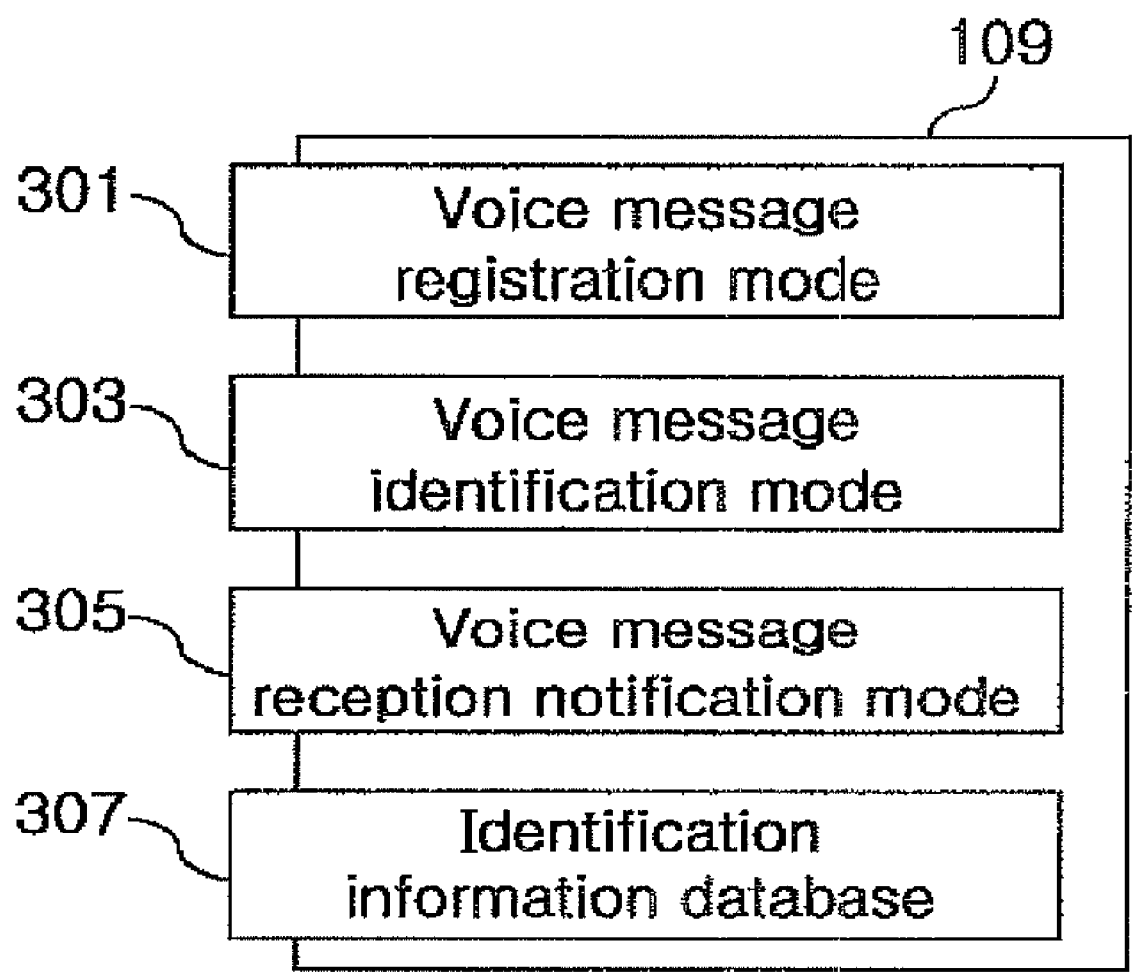

[Fig.4]
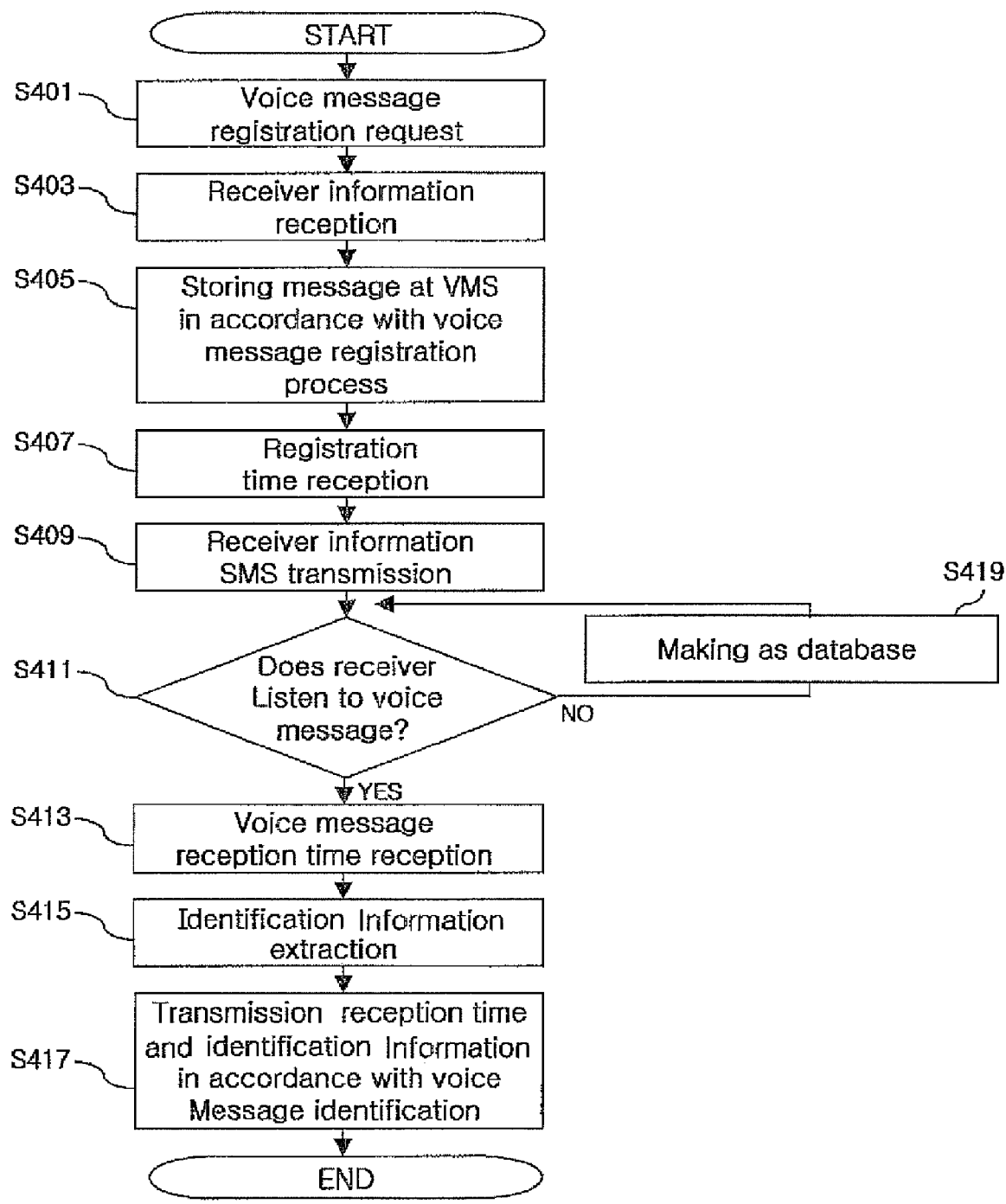

[Fig. 5]
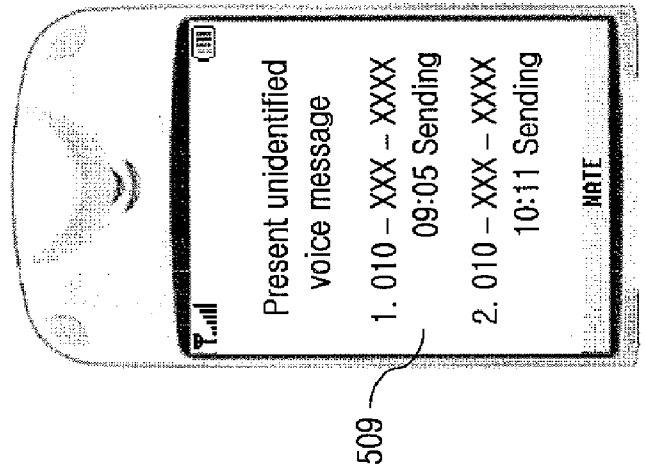
(C)
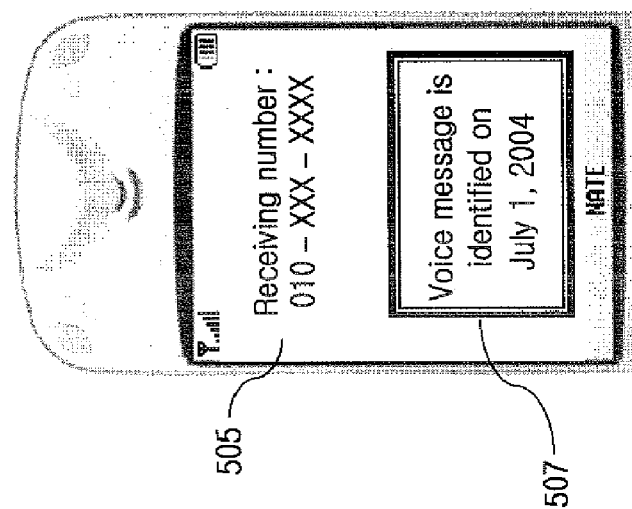
(B)
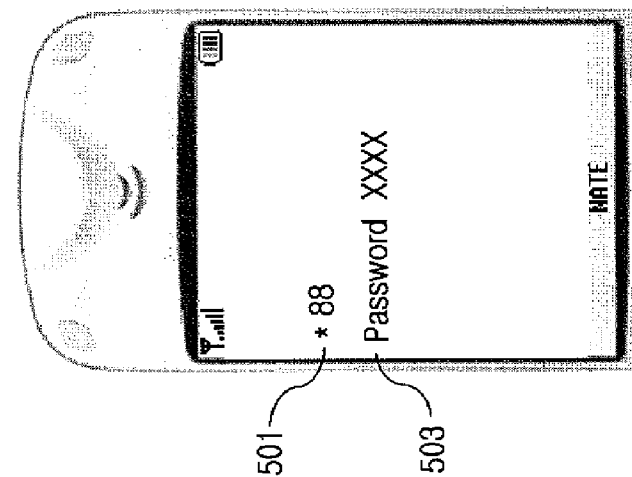
(A)

ature that the voice information of the sender is stored in the voice paging center and the receiver unilaterally hears the stored voice information. Thus, there is no way for the receiver to transmit the reply voice message to the sender's terminal in response to the sender's voice message without the sender's number. Thus, it causes a lot of inconvenience in using the system.

VOICE MESSAGE TRANSMISSION SYSTEM, TRANSMISSION RESULT NOTIFICATION SYSTEM, AND METHODS THEREOF

TECHNICAL FIELD

The present invention relates to a voice message transmission of a mobile communication terminal, and more particularly, to a voice message transmission system, transmission result notification system and methods thereof which are capable of providing a receiving terminal with a voice message transmitted from a sender, and notifying a transmitting result of the voice message transmitted to the receiving terminal and receiver's receiving state to the sender as a short message style.

BACKGROUND ART

Currently, the wireless paging service comprises a numeric paging, which transmits numeric messages, and an alphanumeric paging, which transmits simple letter messages. However, since it is limited to transmit information by numbers or letters, users prefer to use a voice message being capable of expressing unique emotion of human, and the voice mailbox service using the wireless paging network is a kind of a form to satisfy such need. Herein, the voice mailbox service is defined that a sender makes a phone call to leave a voice message in the voice mailbox, the arrival of the voice message is informed to the terminal of the receiver, and the receiver hears the messages by making a phone call to the voice mailbox.

Hereinafter, the most general method of transmitting the voice message of the conventional art will be explained.

First of all, the access to the mobile communication supplementary service, as disclosed in Korean Patent Application No. 0-1997-0066279(title of the invention: Voice Paging Service Provision Method In a Digital Communication Network), proceeds with by a general mobile communication call process, and when the terminal is in the state incapable of receiving, a voice paging service is operated. That is, when a call connection is requested between terminals for transmitting a voice message, the mobile switch requests the location to HLR (Home Location Register) by using a Location Request message, and the HLR confirms the location from VLR (Visitor Location Register) of the visiting place in which the terminal currently locates, and then transmits to the mobile communication switch.

The mobile switch sets a communication path to the visiting place switch, and then performing the paging to the mobile communication terminal. If the terminal sends a paging responding message, a two-way real time phone call is carried out as the user wishes.

DISCLOSURE OF INVENTION

Technical Problem

However, if the terminal is in the area incapable of receiving or the power is off, the visiting place mobile communication switch connects the communication path to the voice paging center, so that a sender can leave a voice message in the voice paging center. Thereafter, the voice paging center waits and re-transmits the message by re-transmission algorithm, and if the terminal power is off and a registered message is received from the terminal via the HLR, the voice message transmission starts.

However, such voice message transmission has the structure that the voice information of the sender is stored in the voice paging center and the receiver unilaterally hears the stored voice information. Thus, there is no way for the receiver to transmit the reply voice message to the sender's terminal in response to the sender's voice message without the sender's number. Thus, it causes a lot of inconvenience in using the system.

Furthermore, under the rapidly changing environment, the conventional voice message system is the system against the current trend, which requires the real time network, and such system has a problem of lowering the applicability of the network.

Technical Solution

Accordingly, it is an object of the present invention to provide a voice message transmission system, transmission result notification system and methods thereof that are capable of simplifying a receiving process of a voice message and performing sender's real-time identification of a voice message reception.

In addition, it is another object of the present invention to provide a voice message transmission system, transmission result notification system and methods thereof that are capable of enhancing the convenience of a voice message reception according as a voice message provided from the sender is outdialed to a corresponding receiving terminal.

In addition, it is still another object of the present invention to provide a voice message transmission system, transmission result notification system and methods thereof that are capable of increasing reliability of a transmission process of a voice message by notifying to a sender a transmitting state of a voice message sent from a sender and a receiving state in accordance with a receiver.

It is a first aspect of the present invention to provide a voice message transmission system, comprising: a sending terminal(MS) registering a voice message and receiving a notice of a message regarding the registered voice information; a base station controller(BSC) carrying out a call connection of the mobile communication network in response to a request for registering the voice message of the sending terminal MS1 received from a plurality of base stations(BTS); a mobile switching station(MSCNLR) carrying out a channel management and control connected from the base station controller (BSC) and carrying out a signal processing function according to the call connection; and an IP server interlocked with the mobile switching station(MSCNLR), storing the voice message and outdialing on the basis of sender information, and then reproducing and outputting the voice message to the receiving terminal in the case that a receiving signal of the receiving terminal is recognized.

It is a second aspect of the present invention to provide a method for transmitting a voice message, comprising the steps of: a) registering connected line information and a voice message from a receiving terminal; b) dialing to a corresponding receiving terminal on the basis of the connected line information; and c) receiving from a receiving signal from the receiving terminal, reproducing and outputting the voice message in response to the receiving result.

It is a third aspect of the present invention to provide a system for notifying a voice message transmission result, comprising: a sending terminal (MS) registering a voice message and receiving a notice of a message regarding the registered voice information; a base station controller(BSC) carrying out a call connection of the mobile communication network in response to a request for registering the voice message of the sending terminal(MS1) received from a plurality of base stations(BTS); a mobile switching station(M-SCNLR) carrying out a channel management and control connected from the base station controller(BSC) and carrying out a signal processing function according to the call connection; a voice mailbox server(ARS/VMS) interlocked with the mobile switching station(MSCNLR), and for storing and managing the voice message on the basis of sender information; and a voice message management server for generating receiving information corresponding to a message identification of the receiving terminal and notification information in accordance with the voice message identification of the receiving terminal, and notifying the receiving information and the notification information to the sending terminal in the case that a registration and a registration notification stored at the voice mailbox server(ARS/VMS) and the registered voice message are identified.

According to a preferable exemplary embodiment, the receiving information is receiver information or receiving terminal number information including time information, which the pre-registered voice message provided to the receiving terminal, and the notification information is direction information which represents the registered voice message is provided to the receiving terminal.

In addition, the voice message management server is selectively interlocked with a short message center(SMC), and transmits receiving information and notification information as a short message style.

In addition, the voice message management server lists and stores an unidentified state of the receiving information and the registration information, and the receiving terminal is provided with the listed unidentified information.

It is a fourth aspect of the present invention to provide a method for notifying a voice message registration result, comprising the steps of: a) registering a voice message from a receiving terminal; b) discriminating whether the registered voice message is identified from the receiving terminal, in the case that the registered voice message is not identified from the receiving terminal in the discriminating result, listing and storing the voice message in accordance with time; c) extracting present time information and generating predetermined identification information in accordance with a voice message identification in the case that the registered voice message is not identified from the receiving terminal in the discriminating result; and d) transmitting the time information and the information to sending terminal.

According to a preferable exemplary embodiment, the time information and the identification information is converted into a short message and then provided to the sending terminal.

In addition, a method for notifying a voice message registration result, further comprises: e) providing the listed information of the unidentified voice message on the basis of a request of the sending terminal.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings:

FIG. 1 illustrates a block diagram of a voice message transmission system in accordance with the present invention;

FIG. 2 illustrates a flow chart for explaining an operation of a voice message transmission system in accordance with the present invention;

FIG. 3 illustrates a block diagram of a main function of a voice message management server adopted in a voice message transmission result notification system in accordance with the present invention;

FIG. 4 illustrates a flow chart for explaining a main operation of a voice message transmission result notification system in accordance with the present invention; and FIG. 5 illustrates a display window of a receiving terminal and a sending terminal in accordance with an exemplary embodiment.

The following Examples are given for the purpose of illustration only and are not intended to limit the scope of this invention.

BEST MODE FOR CARRYING OUT THE INVENTION

Hereinafter, preferable embodiments according to the present invention will be described with reference to the accompanying drawings. Here, when one element is connected to another element, one element may be not only directly connected to another element but also indirectly connected to another element via another element. Further, irrelative elements are omitted for clarity. Also, like reference numerals refer to like elements throughout.

Referring to FIGS. 1 through 5, a preferable embodiment that easily embodied by a person having ordinary skill in the same art that belongs to the present invention will be described in more detail. FIG. 1 illustrates a block diagram of a voice message transmission system in accordance with the present invention.

As depicted in FIG. 1, the voice message transmission system comprises a sending terminal 115(MS) registering a voice message and receiving a notice of a message regarding the registered voice information; a base station controller 111(BSC) carrying out a call connection of the mobile communication network in response to a request for registering the voice message of the sending terminal 115(MS1) received from a plurality of base stations 113(BTS); a mobile switching station 101(MSCNLR) carrying out a channel management and control connected from the base station controller 111(BSC) and carrying out a signal processing function according to the call connection; and an LP server 103 interlocked with the mobile switching station 101(MSCNLR), storing the voice message and outdialing on the basis of sender information, and then reproducing and outputting the voice message to the receiving terminal in the case that a receiving signal of the receiving terminal is recognized.

The switching center 101(MSCNLR) is connected with a home location register 107(HLR), and then recognizes subscriber information corresponding to a receiving terminal 117. In addition, the switching center 101(MSCNLR) is interlocked with a short message center(SMC) can notify a guide message corresponding to a transmission failure of the voice message to the sending terminal 115. This is a guide for apprising when a voice message sent by the sending terminal 115 is not provided to the receiving terminal 117 because of a system error generation or a receiving failure of the receiving terminal 117. On the other hand, the IP server 103 includes an ARS and a VMS.

FIG. 2 illustrates a flow chart for explaining an operation of a voice message transmission system in accordance with the present invention.

As depicted in FIG. 2, a user requests a voice message service using the sending terminal 115 for transmitting a voice message to a specific receiver(S201). The sending terminal 115 is connected with the base station 113, 111 and the mobile switching center 101 on the basis of receiver number information in accordance with a voice message service process. The mobile switching center 101 recognizes the voice message service request from the sending terminal 115.

The mobile switching center 101 performs a switching connection to the IP server(S203). Accordingly, a call connection between the sending terminal 115 and the IP server is performed. The mobile switching center 101 receives terminal number information corresponding to the sending terminal 115 from the home location register 107. In addition, the mobile switching center 101 provides the IP server 103 with the sender information and the receiver information. The IP server 103 stores the sender information and the receiver information at a predetermined memory.

After this, the IP server 103 requests a voice message to the mobile switching center 101. The mobile switching center 101 requests the voice message to the sending terminal 115 in response to the request. A user transmits the voice message using sending terminal 115. The voice message is provided to the IP server 103 via the base station 113, 111 and the mobile switching center 101. The IP server 103 stores the sender information and the receiver information at a random memory.

A completion of the voice message is notified by an operation of a predetermined key of the sending terminal 115, and the mobile switching center 101 recognizes the operation. The mobile switching center 101 notifies an end of the voice message storage to the IP server 103 in response to the predetermined key input. The IP server 103 completes the voice message storage in response to a voice message storage end notification.

The IP server 103 extracts the receiver information from a corresponding memory(S205). And, the receiver information is number information corresponding to the receiving terminal, and the IP server 103 transmits the receiver information to the mobile switching center 101. The IP server 103 requests the mobile switching center 101 a dialing of the receiver information. The mobile switching center 101 performs a switching operation for a call connection with the receiving terminal 117 through a base station 111, 113(S207).

The mobile switching center 101 discriminates whether a reception of the receiving terminal is performed in the switching result. If a reception of the receiving terminal is not performed during a predetermined time and number, the mobile switching center 101 activates the short message server 105(S209). The short message server 105 extracts a pre-stored guide message for a sender and then transmits the same to the mobile switching center 101 notifies a receiving failure of a voice message to the sending terminal 105.

On the other hand, If a reception of the receiving terminal is performed during a predetermined time and number, the mobile switching center 101 notifies a receiving signal of the receiving terminal 117 to the IP server 103(S211). The IP server 103 reproduces the pre-stored sender s voice message in response to a receiving signal. Herein, the receiving signal of the receiving terminal 117, as a call switching adjusted from a receiver, an operation signal of a terminal "send" button or an open-shut signal of a terminal folder. Accordingly, a receiver listens to a corresponding message as a call state stored in case of an arrival of a voice message.

On the other hand, the sending terminal 115 can identify a receiver receiving state, and the above disclosure will be explained as follows.

At first, as depicted in FIG. 1, a system for notifying a voice message transmission result comprises a sending terminal 115(MS) registering a voice message and receiving a notice of a message regarding the registered voice information; a base station controller 111(BSC) carrying out a call connection of the mobile communication network in response to a request for registering the voice message of the sending terminal 115(MS1) received from a plurality of base stations 113(BTS); a mobile switching station 101(MSCNLR) carrying out a channel management and control connected from the base station controller 111(BSC) and carrying out a signal processing function according to the call connection; a voice message management server 109 connected with the mobile switching station 101(MSC/VLR), and for generating receiving information corresponding to a voice message identification and notification information in accordance with the voice message identification in the case that a voice message registration and a registration notification of the sending terminal 115 and the registered voice message are identified; a voice mailbox server 103(ARS/VMS) interlocked with the mobile switching station 101(MSC/VLR), and for storing and managing the voice message on the basis of sender information; and a short message center 105(SMC) interlocked with the switching center 101(MSC/VLR), and for transmitting a registration notification in accordance with the voice message registration and a receiving notification in accordance with a message identification of the receiving terminal of the voice message registration as a short message style. On the other hand, the mobile switching station 101(MSC/VLR) is connected with the home location register 107, and thus subscriber information of the receiving terminal 117 is recognized.

As depicted in FIG. 3, the voice message management server 109 comprises a registration mode 301 for controlling a registration process of a voice message requested from the sending terminal 115, generating a voice message registration time in accordance with the registration, and managing receiver information requested from the sending terminal 115; a identification mode 303 for controlling an voice message identification process of the receiving terminal 117 of the pre-registered voice message, and generating a voice message identification signal and identification time information; a receiving notification mode 305 for responding to the voice message identification signal, and notifying predetermined identification information corresponding to a receiving state of the pre-registered voice message and the voice message to the sending terminal 115; and a identification information database 307 for the identification information.

Referring to the drawings, an operation of the present invention will be described in more detail. FIG. 4 illustrates a flow chart for explaining a main operation of a voice message transmission result notification system in accordance with the present invention.

As depicted, the sending terminal 115 requests a random receiving terminal 115 a voice message registration for transmitting a voice message. The voice message registration can need to a call connection having a separate special category number, but a voice mailbox mode is automatically switched and thus a voice message registration process is received in the case that a receiving operation is not performed after a predetermined time is elapsed.

Accordingly, call connection request information provided to the sending terminal 115 is transmitted to the mobile switching center 101 via the base station controller 111, and the mobile switching center 101 extracts terminal information of the sending terminal 115 via the home location register 101(S401).

A switching operation of the mobile switching center 101 is performed on the basis of number information of the receiving terminal 117 in accordance with the call connection (S403). If a predetermined time is elapsed through the switching process, the mobile switching center 101 guides a process for a voice message registration and is connected with the voice mailbox server 103(S405).

At this time, the voice message management server 109 receives a voice message management request, and generates and stores registration time information by activating the voice message registration mode 301(S407). After this, the short message center 105 transmits a short message for notifying an arrival of a voice message to the receiving terminal 115(S409). The receiving terminal 115 performs a call connection with the mobile switching center 101 on the basis of a short message in accordance with an arrival of the voice message(S411).

Namely, as depicted in (A) of FIG. 5, the receiving terminal 115 tries to a call connection by inputting voice message connection number information 501 for performing a call connection with the voice mailbox server 103 through the mobile switching center 101. if the call connection is performed, the mobile switching center 101 notifies the result thereof to the voice message management server 109, and the voice message management server 109 guides a voice message identification process to the receiving terminal 117 by activating the voice message identification mode 303.

On the other hand, the receiving terminal 117 for listening to a message of the voice mailbox explained above recognizes that a voice message is arrived by the short message center 105. However, in another exemplary embodiment of the present invention, a voice message is outdialed to the receiving terminal 117, the voice message management server 109 recognizes that a corresponding voice message is received to the receiving terminal 117 and then notifies the recognizing result to the short message center 105 after the voice message generated from the sending terminal 115 is accumulated to the voice message management server 109. Accordingly, the receiving terminal 117 can recognize that a voice message is arrived through a character message sent from the short message center 105. Herein, the voice mailbox server 103 stores time information that a corresponding voice message is sent to the receiving terminal 117 and time information that message identification is performed from a notification of the short message center 105 in accordance with a following process.

As described above, if a transmission and a receiving process are completed, the receiving terminal 117 performs an authentication process requested from the voice message management server 109 by inputting pre-adjusted password information 503. If the authentication process is completed, the voice message management server 109 provides the mobile switching center 101 with result information in accordance with authentication identification and then the mobile switching center 101 instructs the voice mailbox server 103 to provide pre-stored voice message information. This process is a process listening to pre-stored voice message information from receiver(S411). If a voice message reproduction of the voice mailbox server 103 is completed, the voice message management server 109 recognizes that a voice message is received to the receiving terminal 117. A voice message identification time is received through a voice message identification mode 303 of the voice message management server 109(S413).

After this, the voice message management server 109 activates the identification information database 307 and then extracts predetermined identification information(S415). As depicted in (B) of FIG. 5, identification information 507, for notifying that a pre-stored voice is identified by the receiving terminal 117 in a display window of the sending terminal 115, is extracted as identification information. The identification information corresponding to a voice message identification of the receiving terminal 117 is transmitted to short message center 105 by activating the voice message reception notification mode 305(S417). Besides, sending terminal information of the sending terminal 115 and receiving time information of the voice message, which is received to the mobile switching center 101 and is recognized in the voice message registration mode 302, is included. Accordingly, the short message center 105 requests the mobile switching center 101 a call connection, if the call connection is performed, provides the sending terminal 115 with the receiving time information of the voice message and the identification information.

Accordingly, a sender recognizes that a voice message to be sent through the sending terminal 115 is sent through the receiving terminal 117. On the other hand, in the case that voice message information registered from the sending terminal 115 is identified by the receiving terminal 117, a storage state of voice message information is made as a database (S419). This implies that an identification state is listed in accordance with time by including an unidentified state of a pre-registered voice message. As depicted in (C) of FIG. 5, the sending terminal 115 can receive an unidentified list of the pre-registered voice message, and a user recognizes a transmission state of a voice message sent on the basis of the unidentified list.

Meanwhile, the preset invention describes that a receiving notification of a voice message is performed by a short message center, but is the receiving notification can be performed. In addition, the preset invention describes that a receiving notification of a voice message is performed between the mobile communication terminals a short message center, but is the receiving notification can be performed. it is absolutely possible to register a voice message on a WAP and a WEB and to pre-registered the voice message can be of course performed. In short, a predetermined identification reception notification or a reception notification in accordance with a voice message are performed though a cable & a wireless terminal such as computer and PDA.

It will be apparent to those skilled in the art that various modifications and variations can be made in the present invention. Thus, it is intended that the present invention covers the modifications and variations of this invention provided they come within the scope of the appended claims and their equivalents.

INDUSTRIAL APPLICABILITY

As disclosed above, according to a voice message transmission system, transmission result notification system and methods thereof in accordance with the present invention a sender can be listen to a voice message without a separate key manipulation according as the voice message is outputted by form a communication path between the IP server and the receiving terminal after registering the voice message sent from a sending terminal to an IP server.

According as whether a voice message provided from a sending terminal is identified by a receiving terminal, a pre-determined character message or a pre-determined voice message in accordance with the discriminating result can be provided, a sender can recognize a transmitting state or an identification state of a voice message pre-registered through his/her sending terminal, and thus the sender need not have a needless desired level and receives the convenience of a voice message use.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

The invention claimed is:

1. A voice message transmission system comprising:
    a sending terminal (MS) registering a voice message and receiving a notice of a message regarding the registered voice information;
    a base station controller (BSC) carrying out a call connection of the mobile communication network in response to a request for registering the voice message of the sending terminal (MS) received from a plurality of base stations(BTS);
    a mobile switching station (MSC|VLR) carrying out a channel management and control connected from the base station controller (BSC) and carrying out a signal processing function according to the call connection;
    an IP server interlocked with the mobile switching station (MSC/VLR), storing the voice message and outdialing on the basis of sender information, and then reproducing and outputting the voice message to the receiving terminal in the case that a receiving signal of the receiving terminal is recognized, and
    wherein the IP server includes a voice mailbox server (VMS) and a voice message management server for generating receiving information corresponding to a message identification of the receiving terminal with said voice message management server comprising:
    a registration mode for controlling a registration process of a voice message requested from the sending terminal, generating a voice message registration time in accordance with the registration, and managing receiver information requested from the sending terminal;
    an identification mode for controlling a voice message identification process of the receiving terminal of the pre-registered voice message, and generating a voice message identification signal and identification time information;
    a receiving notification mode for responding to the voice message identification signal, and notifying predetermined identification information corresponding to a receiving state of the pre-registered voice message and the voice message to the sending terminal; and
    an identification information database for the identification information.

2. The voice message transmission system according to claim 1, wherein the switching center (MSC/VLR) is interlocked with a short message center(SMC) for notifying a guide message corresponding to a transmission failure of the voice message.

3. The voice message transmission system according to claim 1, wherein the IP server includes ARS (Automatic Response Service) and VMS (Voice Mailbox Server).

4. A method for transmitting a voice message, comprising the steps of:
    a) registering connected line information and a voice message from a receiving terminal;
    b) dialing to a corresponding receiving terminal on the basis of the connected line information;
    c) receiving from a receiving signal from the receiving terminal, reproducing and outputting the voice message in response to the receiving result; and
    d) using a voice message management server for generating receiving information corresponding to a message identification of the receiving terminal voice message management server comprising:
    a registration mode for controlling a registration process of a voice message requested from the sending terminal, generating a voice message registration time in accordance with the registration, and managing receiver information requested from the sending terminal;
    an identification mode for controlling a voice message identification process of the receiving terminal of the pre-registered voice message, and generating a voice message identification signal and identification time information;
    a receiving notification mode for responding to the voice message identification signal, and notifying predetermined identification information corresponding to a receiving state of the pre-registered voice message and the voice message to the sending terminal; and
    an identification information database for the identification information.

5. The method for transmitting a voice message according to claim 4, wherein the step (b) comprises:
    b-1) discriminating whether a receiving signal is detected from the receiving terminal;
    b-2) notifying a receiving failure state to the sending terminal in the case that the receiving signal is not detected from the receiving terminal in the discriminating result of the step (b-1); and
    b-3) performing the step (c) in the case that the receiving signal is detected from the receiving terminal in the discriminating result of the step (b-1).

6. The method for transmitting a voice message according to claim 5, wherein the step (b-2) is performed by providing a short message corresponding to the notification of the receiving failure state.

7. A system for notifying a voice message transmission result comprising:
    a sending terminal (MS) registering a voice message and receiving a notice of a message regarding the registered voice information;
    a base station controller (BSC) carrying out a call connection of the mobile communication network in response to a request for registering the voice message of the sending terminal(MS) received from a plurality of base stations(BTS);
    a mobile switching station (MSC/VLR) carrying out a channel management and control connected from the base station controller (BSC) and carrying out a signal processing function according to the call connection;
    a voice mailbox server (VMS) interlocked with the mobile switching station (MSC/VLR), and for storing and managing the voice message on the basis of sender information;
    a voice message management server for generating receiving information corresponding to a voice message identification of the receiving terminal and notification information in accordance with the voice message identification of the receiving terminal, and notifying the receiving information and the notification information to the sending terminal in the case that a registration and a registration notification stored at the voice mailbox server (VMS) and the registered voice message are identified, and wherein the voice message management server comprises:
a registration mode for controlling a registration process of a voice message requested from the sending terminal, generating a voice message registration time in accordance with the registration, and managing receiver information requested from the sending terminal;
an identification mode for controlling a voice message identification process of the receiving terminal of the pre-registered voice message, and generating a voice message identification signal and identification time information;
a receiving notification mode for responding to the voice message identification signal, and notifying predetermined identification information corresponding to a receiving state of the pre-registered voice message and the voice message to the sending terminal; and
an identification information database for the identification information.

8. The system for notifying a voice message transmission result according to claim 7, further comprising:
a short message center(SMC) interlocked with the switching center (MSC/VLR), and for transmitting a registration notification in accordance with the voice message registration and receiving notification in accordance with a message identification of the receiving terminal of the voice message registration as a short message style, wherein registration information and receiving information for the registration notification and receiving notification are voice information.

9. The system for notifying a voice message transmission result according to claim 7, wherein the receiving information is receiver information or receiving terminal number information including time information, which the pre-registered voice message provided to the receiving terminal, and the notification information is direction information which represents that the registered voice message is provided to the receiving terminal.

10. The system for notifying a voice message transmission result according to claim 7, wherein the voice message management server lists and stores an unidentified state of the receiving information and the registration information, and the receiving terminal is provided with the listed unidentified information.

11. A method for notifying a voice message registration result, comprising the steps of:
a) registering a voice message from a receiving terminal;
b) discriminating whether the registered voice message is identified from the receiving terminal, in the case that the registered voice message is not identified from the receiving terminal in the discriminating result, listing and storing the voice message in accordance with time;
c) extracting present time information and generating predetermined identification information in accordance with a voice message identification in the case that the registered voice message is identified from the receiving terminal in the discriminating result;
d) transmitting the time information and the identification information to a sending terminal wherein the identification information corresponds to a message identification of the receiving terminal; and
e) using a voice message management server for generating receiving information corresponding to a message identification of the receiving terminal with the voice message management server comprising:
a registration mode for controlling a registration process of a voice message requested from the sending terminal, generating a voice message registration time in accordance with the registration, and managing receiver information requested from the sending terminal;
an identification mode for controlling a voice message identification process of the receiving terminal of the pre-registered voice message, and generating a voice message identification signal and identification time information;
a receiving notification mode for responding to the voice message identification signal, and notifying predetermined identification information corresponding to a receiving state of the pre-registered voice message and the voice message to the sending terminal; and
an identification information database for the identification information.

12. The method for notifying a voice message registration result according to claim 11, wherein the time information and the identification information are converted into a short message and then provided to the sending terminal.

13. The method for notifying a voice message registration result according to claim 11, wherein the time information and the identification information are converted into a voice message and then provided to the sending terminal.

14. The method for notifying a voice message registration result according to claim 11, wherein a process for identifying the voice message from the receiving terminal the in the step (c) comprises:
c-1) outdialing the pre-registered voice message to the receiving terminal by a voice mailbox server;
c-2) notifying the outdialing state to a short message center from the voice mailbox server; and
c-3) notifying a receiving state of the receiving terminal to the receiving terminal from the short message center.

15. The method for notifying a voice message registration result according to claim 11, further comprising:
providing the listed information of the unidentified voice message on the basis of a request of the sending terminal.

16. A system for a voice message transmission and a voice message transmission result notification, comprising:
a sending terminal (MS) registering a voice message and receiving a notice of a message regarding the registered voice information;
a base station controller (BSC) carrying out a call connection of the mobile communication network in response to a request for registering the voice message of the sending terminal (MS) received from a plurality of base stations(BTS);
a mobile switching station (MSC/VLR) carrying out a channel management and control connected from the base station controller (BSC) and carrying out a signal processing function according to the call connection;
an IP server interlocked with the mobile switching station (MSC/VLR), storing the voice message and outdialing on the basis of sender information, and then reproducing and outputting the voice message to the receiving terminal in the case that a receiving signal of the receiving terminal is recognized;
a voice message management server for generating receiving information corresponding to a message identification of the receiving terminal and notification information in accordance with the voice message identification of the receiving terminal, and notifying the receiving information and the notification information to the sending terminal in the case that a registration and a registration notification stored at the IP server and the registered voice message are identified, and wherein the voice message management server comprises:

a registration mode for controlling a registration process of a voice message requested from the sending terminal, generating a voice message registration time in accordance with the registration, and managing receiver information requested from the sending terminal;

an identification mode for controlling a voice message identification process of the receiving terminal of the pre-registered voice message, and generating a voice message identification signal and identification time information;

a receiving notification mode for responding to the voice message identification signal, and notifying predetermined identification information corresponding to a receiving state of the pre-registered voice message and the voice message to the sending terminal; and an identification information database for the identification information.

17. The system for a voice message transmission and a voice message transmission result notification according to claim 16, wherein the IP server includes ARS (Automatic Response Service) and VMS (Voice Mail Service).

18. The system for a voice message transmission and a voice message transmission result notification according to claim 6, further comprising:

a short message center(SMC) interlocked with the switching center (MSC/VLR), and for transmitting a registration notification in accordance with the voice message registration and a receiving notification in accordance with a message identification of the receiving terminal of the voice message registration as a short message style, wherein registration information and receiving information for the registration notification and receiving notification are voice information.

19. The system for a voice message transmission and a voice message transmission result notification according to claim 16, wherein the receiving information is receiver information or receiving terminal number information including time information, which the pre-registered voice message provides to the receiving terminal, and the notification information is direction information which represents that the registered voice message is provided to the receiving terminal.

20. The system for a voice message transmission and a voice message transmission result notification according to claim 16, wherein the voice message management server lists and stores an unidentified state of the receiving information and the registration information, and the receiving terminal is provided with the listed unidentified information.

* * * * *